March 14, 1950     C. B. BOULTON     2,500,340
METHOD OF RESURFACING PISTON CHAMBERS
Filed Sept. 22, 1945
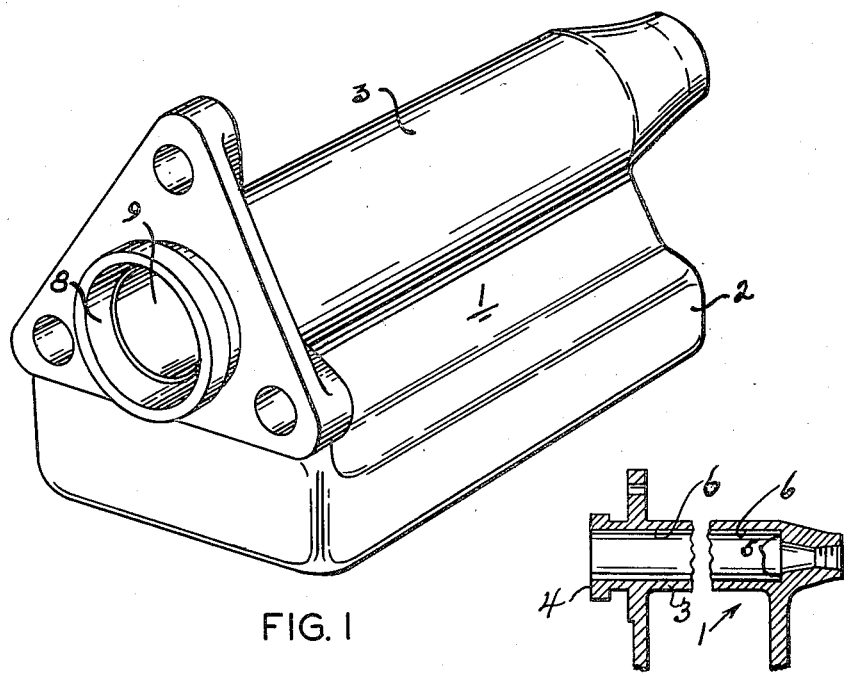
FIG. 1
FIG. 3
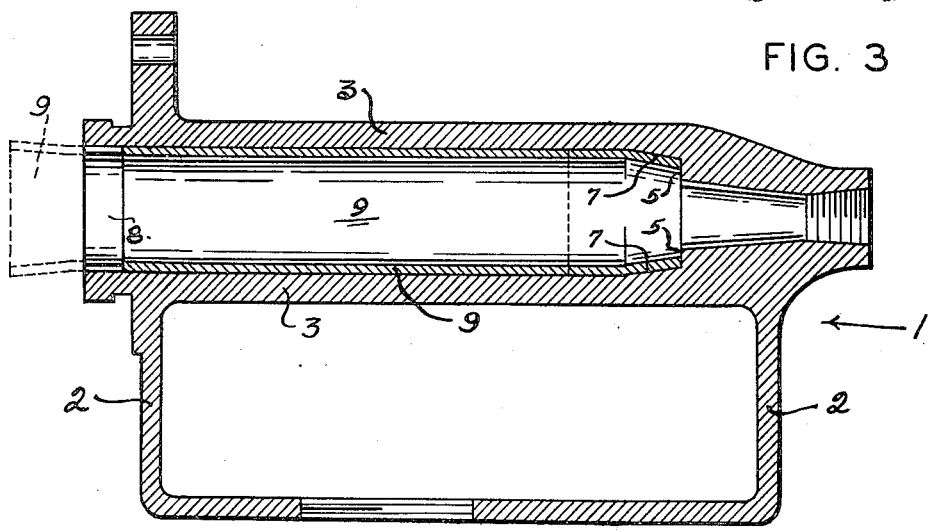
FIG. 2
FIG. 4
Carson B. Boulton
INVENTOR.
BY Loyal J. Miller
ATTORNEY Patented Mar. 14, 1950

2,500,340

UNITED STATES PATENT OFFICE 2,500,340

METHOD OF RESURFACING PISTON CHAMBERS

Carson B. Boulton, Oklahoma City, Okla.

Application September 22, 1945, Serial No. 617,946

2 Claims. (Cl. 29—156.4)

My invention relates to the over-hauling, repairing, or re-surfacing worn piston chambers, and more particularly to the method of and means for accomplishing such repairs through the installation of a wear sleeve in such chambers.

While the invention is applicable to many types of piston chambers, it is particularly adaptable to the master cylinder or chamber of hydraulic brake systems for automotive vehicles. The descriptive matter herein has therefore been confined principally to the invention so far as it applies to such systems.

The hydraulic fluid used in usual automotive brake systems contains ingredients which attack and eventually "pit" the walls of the master cylinder, or in other words, the walls of the master piston chamber.

It has become a common practice to re-bore and grind the cylinder wall in an attempt to obtain a perfectly smooth cylindrical surface along which the piston travels. In many cases, after the cylinder has been re-bored, it is found that the "pits" are so deep that they cannot be machined out without making the walls too thin for practical operation and safety. This condition, in many cases is not revealed until after the time and expense of re-boring has been involved.

If the cylinder walls were of a sufficient thickness, it would be a simple matter in such cases to expand the cylinder through the application of heat, and to then press a steel sleeve into the same to form a working surface for the piston. Such method has been tried and found wanting. Since the original thickness of the cylinder wall is limited, such a sleeve must be comparatively thin, and a thin steel sleeve is distorted by the shrinking of the cylinder body as it cools. This distortion defeats the attainment of a perfectly smooth working surface.

Some attempt has been made in the past to resleeve such piston cylinders by pressing in sleeves without previously expanding the body through the application of heat. This practice has proven impractical due to the fact that the seal obtained between the exterior surface of the sleeve and the interior surface of the chamber body is not hermetic. The result is that the pressure fluid escapes through the breather hole in the sleeve into the crevice between the sleeve and the body.

It is the prime object of the present invention to provide a re-sleeving method and structure which will attain a hermetic seal between the sleeve and the chamber body, without deformation of the interior working surface of the sleeve.

A further object is to attain such results through a cold or non-heated process.

Another object is to provide a re-sleeving process for piston chambers which is simple and comparatively cheap to carry out.

Further objects will be apparent from the following descriptions when taken in conjunction with the accompanying single sheet of drawings, wherein:

Figure 1 is a perspective view of a typical or conventional master cylinder body of a hydraulic brake system, the bore of said body being formed to accommodate the sleeve of the present invention;

Figure 2 is a vertical sectional view taken axially through the body of Fig. 1;

Figure 3 is a similar fragmentary view of a typical prior art master cylinder body; and, Figure 4 is an elevational view of a swaging tool used in carrying out the inventive process of sleeve installation.

Like characters of reference designate like parts in the figures in which they occur.

In the drawings:

The reference numeral 1 indicates, as a whole, a master piston chamber body having a hollow base 2, and thereabove, a cylindrical portion 3 which is longitudinally bored axially to form a piston chamber. In its original form, the bore was perfectly cylindrical from the left hand end 4 of the body to an abrupt shoulder 5 adjacent the right hand end of the body. This original bore is shown in Fig. 3, and is indicated by the reference numeral 6. It is the surface of the bore 6 which becomes worn and pitted in use, and it is the irregularities in this surface which the present invention is designed to overcome.

In overhauling or repairing worn piston chamber surfaces 6 according to the present invention, the cylindrical portion 3 of the body 1 is first bored out to a greater diameter than the original diameter of the surface 6. The portion of the bore lying nearest its right hand end is tapered gradually inwardly to form a conical seat 7 which terminates at the shoulder 5. The left hand end portion of the bore might well be termed a seat portion, and is indicated by the reference numeral 8.

As a means for furnishing a new wear surface 6, there is provided a tubular sleeve 9, which is preferably made of brass but which could well be made of some other malleable metal. When in its original form, the major portion of the sleeve 9 is exteriorly cylindrical, and its left hand end portion is flared as depicted in the dotted lines of Fig. 2. The outside diameter of the cylindrical portion of the sleeve 9 is substantially equal to the diameter of the enlarged bore of the cylinder 3. When the sleeve 9 is pressed into the cylinder 3 through the open left hand end thereof, the sleeve will pass freely into the cylinder only until its right hand end reaches the taper of the seat 7. The sleeve 9 is so designed, that when its right hand end reaches the larger end of the seat 7, its flared left hand end portion will contact the left hand end of the seat 8.

When the sleeve 9 reaches this position in the body, a swaging tool 11 (Fig. 4), is placed inside the sleeve, and the tool and sleeve are driven further into the body. The tool 11 is of proper dimension and configuration to exactly fit the inside of the cylinder 3, but allowing for the thickness of the sleeve 9.

The tool 11 has a head 13 which provides an abrupt annular shoulder 12, and the shoulder 12 is adapted to contact the outer, or left hand flared end of the sleeve 9 to force the same longitudinally into the bore of the cylinder. By driving the tool and sleeve by hammer blows upon the head 13 of the tool, the sleeve is forced to conform so contiguously to the tapered seat 7 and the seat 8 that a hermetic seal is accomplished between the sleeve and the two seats. The inner or right hand end of the sleeve 9 is also driven into hermetic engagement with the shoulder 5 of the chamber. This installation is made without the application of heat to either the body 1 or the sleeve 9.

After the sleeve is installed, it thenceforth acts as the wear surface for the master piston, not shown.

As stated hereinabove, the above described method of sleeve installation could well be used for resurfacing numerous and various piston chambers. Obviously, each particular chamber may require a different one of the tools 11, and also a sleeve 9 of proper dimension. It is also apparent that reasonable variations could well be made in the installation process, without defeating the beneficial results of the invention, and I therefore do not wish to limit myself to the exact installation steps described hereinabove, nor to the exact structure shown and described herein, further than I am limited by the scope of the appended claims.

I claim:
1. The method of surfacing piston chamber walls, including: boring the chamber wall to provide a conical seat beyond one end of the permitted piston travel in the chamber; flaring one end portion of a malleable metal hollow cylindrical sleeve to a diameter greater than the diameter of the chamber wall and then forcibly inserting the sleeve into the chamber to deform one end into hermetic coincidence with the seat and to simultaneously compress the flared end into similar coincidence with the other end portion of the chamber wall.

2. The method of surfacing piston chamber walls, including: boring the chamber wall to provide a restricted area beyond one end of the permitted piston travel in the chamber; flaring one end portion of a malleable metal hollow cylindrical sleeve to a diameter greater than the diameter of the chamber wall, and then forcibly inserting the sleeve into the chamber to deform one end into hermetic coincidence with the area and to simultaneously compress the flared end into similar coincidence with the other end portion of the chamber wall.

CARSON B. BOULTON.

REFERENCES CITED

The following references are of record in the file of this patent:

UNITED STATES PATENTS

| Number | Name | Date |
| --- | --- | --- |
| 72,884 | Naves | Dec. 31, 1867 |
| 1,768,799 | Stanley | July 1, 1930 |
| 1,971,433 | Tartrais | Aug. 28, 1934 |
| 2,065,595 | Lynch | Dec. 29, 1936 |
| 2,078,195 | Cornell | Apr. 20, 1937 |
| 2,078,903 | Domack | Apr. 27, 1937 |
| 2,094,858 | Stansberry | Oct. 5, 1937 |
| 2,118,317 | Mader | May 24, 1938 |
| 2,127,825 | Mader | Aug. 23, 1938 |
| 2,144,117 | Miller | Jan. 17, 1939 |
| 2,281,973 | Healy | May 5, 1942 |
| 2,309,181 | Franck | Jan. 26, 1943 |
| 2,324,547 | Wagner | July 20, 1943 |
| 2,325,480 | Crawford | July 27, 1943 |
| 2,331,554 | Irgens | Oct. 12, 1943 |
| 2,387,698 | Yost | Oct. 23, 1945 |